United States Patent [19]
Ohlin et al.

[11] Patent Number: 6,123,975
[45] Date of Patent: *Sep. 26, 2000

[54] IMPROVER FOR MICROWAVE-REHEATABLE BAKERY PRODUCTS

[76] Inventors: Edward Arthur Ohlin, 13 Piney Run Pd., Medford, N.J. 08055; Didier Marie Adolf Biebaut, 19 Fazantenlaan, 9320 Erembodegem, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/843,812

[22] Filed: Apr. 21, 1997

[51] Int. Cl.⁷ .......................... A21D 17/00; A21D 13/00; A21D 15/00
[52] U.S. Cl. ............................ 426/549; 426/94; 426/107; 426/234; 426/237; 426/243; 426/553; 426/555; 426/558
[58] Field of Search ............................... 426/549, 94, 107, 426/234, 555, 558, 553, 237, 243

[56] References Cited

U.S. PATENT DOCUMENTS

| | | | |
|---|---|---|---|
| 4,496,601 | 1/1985 | Rispoli et al. | 426/554 |
| 4,857,353 | 8/1989 | Jackson et al. | |
| 5,110,614 | 5/1992 | Corbin et al. | 426/555 |

FOREIGN PATENT DOCUMENTS

| | | |
|---|---|---|
| 0617896 A2 | 10/1994 | European Pat. Off. . |
| 0617896 A3 | 10/1994 | European Pat. Off. . |

*Primary Examiner*—Chhaya D. Sayala
*Attorney, Agent, or Firm*—Knobbe, Martens, Olson & Bear, LLP

[57] ABSTRACT

A tenderizer for microwave-reheatable baked products, which is added to doughs to make fully or partially baked products, contains at least the following ingredients: fat, proteins selected from the group of soy and egg proteins, and methylcellulose. The tenderizer prevents the baked products from becoming tough or chewy upon microwave-reheating.

20 Claims, No Drawings

IMPROVER FOR MICROWAVE-REHEATABLE BAKERY PRODUCTS

BACKGROUND OF THE INVENTION

The present patent application relates to an improver for fully or partially baked products reheated by microwave irradiation.

The request for food products which can be thawed and/or heated in microwave ovens is continually increasing, as well as the consumption of these products.

Families, catering companies, restaurants and fast food chains confirm this tendency. The consumer wants a high quality product, comparable to the standard food product, providing a minimal preparation time.

Several sources describe how baked products which have been exposed to microwave irradiation, have an increased toughness and a rubber or leatherlike texture. Immediately after reheating with microwave irradiation, the baked products are extremely soft, but during the process of cooling down, toughness increases quickly; and after a while, hardening too. Limiting or preventing the humidity loss, does not solve the problem.

At least four published hypotheses try to explain the cause of increased toughness:

(1) During the conventional baking process, amylose leaks out of the starch granules. These amylose molecules, leaked out of the starch granule, surround the granule, and orient themselves in the same direction. They are partially responsible for the bread crumb's quick hardening. Gradual retrogradation of amylopectin explains the ageing process over a longer period. (Stoch, T. J., Starch in Bakery Products, Bakers Digest 39 (2), 48–57 (1965)). When exposed to microwave irradiation, more amylose leaks out of the starch granule. This amylose is less oriented and contains less bound water than a conventionally reheated bread.

A possible cause could be the more intense agitation of amylose molecules in the microwave oven. (Mudgett, R. E., Wang, D. I. C., and Goldblith, S. A. 39, 632–635.: Prediction of Dielectric Properties in Oil-water and Alcohol-water Mixtures at 3000 Mhz, 25° C. Based upon Pure Component Properties, Journal of Food Science (1974)).

Such a degree of disorder between amylose chains and perhaps also between gluten polymers determines the extremely high initial degree of softness.

During conventional reheating, less amylose leaks out of the starch granules, and there is also less disorder between the amylose chains. This results in an initially harder bread crumb.

During cooling and storage, the opposite situation takes place.

After having been exposed to microwave irradiation, the amylose, leaked out of the starch granules, has more ability to form crystalline structures, than if it were reheated in a conventional way. (Higo, A., Shimzaki, M., Noguchi, S. and Nazakawa, F., part 9, 34, 251–257: Hardening of Food Texture Induced by Microwave Irradiation, Japanese Journal of Home Economics (1983)).

Baked products age (=amongst others hardening of the crumb) quickly after microwave irradiation, because the amylose chains orient themselves in rigid structures.

(2) A second hypothesis relies upon the "Pseudo- Hydration Effect", as described by Higo and Noguchi. (Higo, A. and Noguchi, S., 34(12), 781–787: Comparative Studies on Food Treated with Microwave and Conductive Heating, Process of Bread Hardening by Microwave Heating, Journal of Japanese Society of Food Science and Technology. (1987)).

When the bread is reheated with microwave irradiation, the system behaves as if more water were present. Heating of the starch granules in an excess of water gives a similar effect:

increased leaking of amylose out of the starch granules;

the initial disorder between the amylose chains increases, because there is a better dispersion in the excess of water;

upon cooling and storage, the retrogradation in the amylose fraction is increased, because polymers have an enhanced tendency to orient themselves into tight crystalline bundles of double amylose helixes.

When microwave reheating, the water in the bread crumb behaves as if it were less bound, compared to conventional heating.

The system behaves as if more water or water with an enhanced mobility were present.

(3) Molecular agitation of dipoles through microwave irradiation causes heat and can have such a strong effect on the starch granules that the macromolecular structure of the starch is (temporarily) lost.

Immediately after microwave treatment, the bread becomes extremely soft, almost fluid, as a consequence of the temporary or maybe partial liquefaction of the starch (Higo et al., part 10, 34, 474–479: Hardening of Food Texture Induced by Microwave Irradiation, Japanese Journal of Home Economics (1983)).

(4) Reheating of food products with microwave irradiation causes a strong increase in toughness.

Toughness is an elastic property (Huang, V.T. et al., Starch-Based Products for Microwave Cooking or Heating, U.S. Pat. No. 5035904 (1991)).

The enhanced softness and the lack of elasticity in bread, immediately after heating in the microwave oven, disappears upon cooling, and becomes a tough, rubberlike and hard texture which does not occur in conventional heating.

Rogers et al. (Rogers, D. E., Doescher, L. C. and Hoseney, R. C., 67 (2), 188–191: Texture Characteristics of Reheated Bread, Cereal Chemistry (1990)) noticed that increased cross-linking between protein polymers is more than likely not the cause of the product's toughness.

Hydrogen bonds (at temperatures around 100° C.) cannot exist and account for toughness.

A possible explanation for increased toughness is based on the hypothesis that microwave heating orients gluten polymers in such a way that, during cooling, unusually strong hydrogen bonds may create rubberiness.

Polymer orientation can also result into increased hydrophobic interactions (Martin, M. L., Zeleznak, K. J. and Hoseney, R. C., 68(5), 498–503: A Mechanism of Breadfirming, Role of Starch Swelling, Cereal Chemistry (1991)).

EP-0620975 A2 describes a method to thaw and heat low fat baked products, with microwave irradiation. In this patent application, steam is the only heat source used to bake the fermented piece of dough. After freezing, the baked products are thawed and reheated with microwave irradiation. This operating mode only has a limited area of application.

The U.S. Pat. No. 5,110,614, describes an operating mode to prepare baked products, used for reheating in a microwave oven, and based upon a premix or a complete mix. This patent analyses the problem of the baked products' toughness, in microwave applications, and proposes the usage of a premix in powder form, or a complete mix, composed as following:

milk proteins, fat, egg powder, lecithin, and microcrystalline cellulose.

Although there is an improvement compared to an end product without this additive, it has been noted that the use of such a product in baked products, does not yield a satisfying result, because the baked end product remains tough and rubberlike after having been exposed to microwave irradiation. The results are even less conclusive when thawing and heating the frozen product.

The document Cereal Foods World, November 1991, volume 36 number 11 pages 941–944 (XP 000617106, Bell and Steinke), describes an evaluation of the effects on structure and texture of methylcellulose gums in microwave-baked cakes. An improvement in cake volume, structure and moisture retention is observed when baking cakes with microwave irradiation. This improvement is assayed using hydroxypropyl methylcellulose. It has to be stressed that this product has no significant effect on toughness in yeast-raised baked products. Toughness was not assayed, and only one type of baked good was tested. Cake is chemically leavened with a high sugar content of more than 15%.

In WO 93/16598, cellulose ethers are used to partly replace flour or starch in low-cholesterol cookies. The dough contains 50% or less flour or starch. The function of the cellulose ethers is to improve palatability.

SUMMARY OF THE INVENTION

The demand for ingredients and/or additives which maintain the organoleptic and rheologic properties of fully or partially baked products after reheating in the microwave oven, forms the basis of this invention.

The present invention concerns an improver (called hereafter: microwave improver), used for preparing fully or partially baked products designed to be reheated with microwave irradiation from room temperature, or from freezer temperature, and designed to keep their organoleptic and rheologic properties.

The concept of the "improver" refers to the mixture of functional ingredients in baked products. This functionality can aim at the modification of the dough's properties and/or the properties of the baked end product and/or their intermediates (such as dough)

According to the invention, the improver as mentioned above is an improver for dough usable to obtain fully or partially baked products that are less tough after microwave reheating and which comprise at least the following functional ingredients:

fat, proteins selected from the group consisting of soy and egg proteins, methylcellulose (E461).

Said improver comprises preferably:

5–15 weight % proteins selected from the group consisting of soy and egg proteins, 40–60 weight % fat 1–6 weight % methylcellulose.

Said improver also comprises from 19 to 54 weight % of additional ingredients (all the weight % are based on the total weight of the composition being 100%).

According to the invention, the additional ingredients which may be incorporated into the improver according to the invention are optional ingredients also called additives preferably chosen among the group consisting of proteins (such as gluten), fat (such as hydrogenated soya oil), emulsifiers (such as diacetyl tartaric acid esters of monoglycerides), enzymes (such as amylases, xylanases), oxidizers (such as bromate), antioxidizers (such as ascorbic acid), reducers (such as: cysteine), polysaccharides (such as guar or starch), yeast and products that are based on yeast (extracts of yeast) which are also active (functional) in baked products.

The improver may also comprise as additional ingredients, the usual ingredients which do not correspond to the definition of the optional ingredients as described above. Typical examples of these usual ingredients are salt, water, flour, etc.

The above functional ingredients of the improver are preferably prepared in an homogeneous mixture. This homogeneous mixture can be a paste or a dry powder.

In order to facilitate the mixing process of dry ingredients, it is possible to mix these functional ingredients together and dilute them by adding a carrier such as starch or flour.

The present invention is also related to the fully or partially baked products that retain their usual organoleptic characteristics after reheating by microwave and which comprise the improver according to the invention. Preferably, in the baked products according to the invention, the improver content varies between 2 and 20% on flour weight (weight/weight).

Another aspect of the present invention is related to the fully or partially baked products comprising 0.5–3% on flour weight proteins selected from the group consisting of soy and egg proteins, 4–15% on flour weight fat and 0.1–1.2% on flour weight methylcellulose and (the weight percentages are based on the total flour weight).

In said composition, the functional ingredients (fat, proteins selected from the group consisting of soy and egg proteins and methylcellulose) can be added in the dough of the baked product as a mixture in the form of the improver according to the invention or can be added in the dough of the baked product separately.

Preferably, the fully or partially baked product is yeast raised. Advantageously, in said fully or partially baked product, the amount of sugar is equal or less than 15% and the amount of flour is equal or more than 50%.

According to a preferred embodiment of the present invention, in the fully or partially baked products according to the invention, the water content varies between 45% and 65%, the yeast content varies between 3% and 8%, the salt content varies between 1.5% and 2.5%, the sugar content varies between 0% and 15%, and the fat content varies between 0% and 14% (all % expressed as percentages of flour weight).

Another aspect of the present invention is related to the process for the preparation of fully or partially baked products wherein the improver according to the invention is added into the dough of said fully or partially baked products.

A last aspect of the present invention is related to the use of the improver according to the invention for the preparation of fully or partially baked products.

The baked products according to the invention can be preserved at room temperature or freezer temperature until the time of reheating.

The magnetron improver gives reheated baked products a taste, shape, appearance, and rheologic texture which is comparable to baked products which would have been reheated through conventional heating.

More specifically, the microwave improver makes sure that the toughness or the rubberlike texture of baked products, reheated with microwave irradiation, does not increase at all or only very slightly.

The invention can also be applied to the production of frozen doughs (fully fermented or not), used for the production of partially or fully baked products, to be reheated in the microwave oven.

DETAILED DESCRIPTION OF THE PREFERRED EMBODIMENT

The following examples are presented as illustrations of the preferred embodiment of the invention without limiting its scope:

EXAMPLE 1

One prepares fully or partially baked products according to the usual baking process, by using a recipe containing usual ingredients such as wheat flour, water, yeast, salt, sugar and fat, and other ingredients such as microwave improver and one or more of the optional ingredients as mentioned above.

The composition of the microwave improver, total being 100%, is:

| | |
|---|---|
| Shortening (fat) | 54% |
| Protein selected from the group of soy and egg protein | 20% |
| Methylcellulose (E461) | 4% |
| carrier | |

The water content varies between 45% and 65% (expressed in % on flour weight), the percentage of yeast between 3% and 8%, the % of salt between 1.5% and 2.5%, sugar between 0–15%, and fat between 0–14%.

The microwave improver is also added to the recipe (between 10% and 20%, depending on the concentration).

A possible operating mode for the use of the microwave improver would be:

the ingredients of the recipe are blended and mixed until optimal dough development is achieved;

the dough is divided, rounded, and then molded into its desired shape. The dough is then put in the proof box at temperatures between 25° C. and 40° C., and a relative air humidity varying between 75% and 95% the fully proofed dough pieces can be retarded at temperatures between −2° C. and +4° C., during 12H maximum.

After fermentation, if desired in combination with dough retarding, the dough is partially or fully baked in a conventional oven during 7 to 45 min., depending on the shape and the mass of the dough pieces.

After the baking process, the (partially or fully) baked products are cooled down to room temperature, packed in a closed polyethylene or polypropylene packaging, and preserved at room temperature (15° C. to 30° C.), or freezer temperature (≦−18° C.).

In the latter case, reheating takes place in the microwave oven, without previous thawing.

The shape, weight and desired core temperature of the baked products as well as the capacity utilization of the microwave oven, determine the power and the microwave exposure.

Immediately after reheating, the core temperature reaches 65° C. to 90° C.

EXAMPLE 2

Production of hamburger buns in a direct dough system, using the following recipe.

| Ingredients | (expressed on flour weight) |
|---|---|
| Wheat flour | 100 |
| Water | 56 |
| Compressed Yeast | 6 |
| Salt | 2 |
| Sugar | 6 |
| Fat | 6 |
| Microwave improver (same as in example 1) | 15 |
| Bread improver (*) | 1 |

(*) composition: see later

During 1'30", the ingredients are blended and mixed during 11> in an Artofex mixer (other types of mixers can also be used). At the end of the mixing, the dough temperature varies between 28° C. and 30° C.

The dough is immediately divided into large dough pieces of 1700 g (=for 30 hamburger buns) and given a 10 min. intermediate proofing.

A divider/rounder divides the dough in individual dough pieces of +/−57 g, followed by a second intermediate proof of 10 min. The dough pieces are molded, put on hamburger baking trays and given a final proofing during 60 min. at a temperature of 40° C. and a relative humidity of 90%. The fully fermented hamburger buns are baked in a deck oven during 10 min. (without steam). Other ovens can also be used. After cooling for 60' at room temperature, the buns are packed in sealed polypropylene bags and preserved at room temperature or freezer temperature (=−18° C.), during 4 days. Reheating in the microwave oven depends on the storing temperature:

For a storage at:

Room temperature: t=10"/bun at P=1000W

Until core temperature of: 65° C. −75° C.

Freezer temperature: t=40"/bun at P=500W

Until core temperature of 65° C. −85° C. is reached.

Results:

Comparative baking tests were carried out between hamburger buns without microwave improver and hamburger buns with 15% microwave improver(see U.S. Pat. No. 5110614 (1)), hamburger buns with Carawave improver (Caravan Products (2)),and hamburger buns with 15% of microwave improver as in example 1.

(1) Composition of the improver as prepared in the U.S. Pat. No. 5110614 (Microgold P 1250 c®).

(2) Composition of the Carawave Improver: Vegetable shortening, corn starch, oat fiber, corn syrup solids, monoglycerides, algin, soy oil.

Optional ingredients, contained in a 1% bread improver, responsible for volume, softness, shelf life, crumb structure and crumb color of hamburger buns. These ingredients are less important for keeping the product's toughness under control upon microwave irradiation.

Immediately after reheating the hamburger buns in the microwave oven, a test panel, composed of 10 trained specialists, will evaluate the organoleptic properties of the buns and their degree of toughness. This evaluation takes place for buns, preserved at room temperature, as well as for buns preserved at freezer temperature.

1. Heating From Room Temperature

Baking tests no. 2 & 3 have a better effect on limiting the product's toughness than baking tests no. 1 (=reference) and no.4 (Carawave). Baking test no. 3 results in buns which are, on average, less tough than the buns of baking test no. 2, although there is only a limited difference.

2. Heating From Freezer Temperature

Hamburger buns from baking test no. 3, heated in a microwave oven (in baking test no. 3) is clearly less tough than the buns of baking test 2 and significantly less tough than those of tests 1 and 4. The difference between baking tests no. 2 and 3 is more obvious when reheating starts from freezer temperature, compared to room temperature. More than likely, this is due to the fact that toughness increases as exposure time to the microwave increases.

The combination of fat, egg and soy proteins and methylcellulose as contained in a microwave improver with a preferred concentration of 15% on flour weight has a considerable effect on limiting the increase in toughness of baked products exposed to microwave irradiation.

What is claimed is:

1. An improver for microwave-reheatable baked products, comprising fat, proteins selected from the group consisting of soy and egg proteins, and methylcellulose.

2. An improver according to claim 1, which comprises 40–60% by weight of fat, 5–15% by weight of proteins selected from the group consisting of soy and egg proteins, 1–6% by weight of methylcellulose, and 19–54% by weight of additional ingredients.

3. An improver according to claim 1, further comprising an ingredient selected from the group consisting of proteins, fats, emulsifiers, enzymes, oxidizers, antioxidizers, reducers, polysaccharides, mold inhibitors, yeast, yeast extracts, and a mixture of the foregoing.

4. An improver according to claim 1, wherein the fat, the proteins, and the methylcellulose are formed in a homogeneous mixture.

5. An improver according to claim 4, further comprising a carrier selected from the group consisting of starch and flour, wherein the homogeneous mixture has been obtained by mixing mutually the fat, the proteins, and the methylcellulose to form an active material and adding thereto the carrier to adjust the concentration of the active material.

6. A fully or partially baked microwave-reheatable product, comprising flour and the improver according to claim 1.

7. A fully or partially baked product according to claim 6, wherein said baked product comprises, based on the weight of the flour, 0.5–3% by weight proteins selected from the group consisting of soy and egg proteins, 4–15% by weight fat, and 0.1–1.2% by weight methylcellulose.

8. A fully or partially baked product according to claim 6, which is a yeast-raised product.

9. A fully or partially baked product according to claim 6, comprising polysaccharides in an amount of 50% or less by weight.

10. A fully or partially baked product according to claim 6, comprising flour in an amount 50% or more by weight.

11. A fully or partially baked product according to claim 6, comprising, based on the weight of the flour, the improver in an amount of 2–20% by weight.

12. A fully or partially baked product according to claim 6, comprising, based on the weight of the flour, water in an amount of 45–65% by weight, yeast in an amount of 3–8% by weight, salt in an amount of 1.5–2.5% by weighy, sugar in an amount of 15% or less by weight, and fat in an amount of 14% or less by weight.

13. A fully or partially baked product according to claim 6, which is frozen or refrigerated.

14. A fully or partially fermented frozen or refrigerated dough for a microwave-reheatable baked product, comprising flour and the improver according to claim 1.

15. A fully or partially fermented frozen or refrigerated dough according to claim 14, comprising the improver in an amount of 2–20% by weight based on the weight of the flour.

16. A process of producing a fully or partially baked product for microwave-reheating, comprising the steps of adding the improver according to claim 1 to a dough for making the fully or partially baked product, and fully or partially baking the dough.

17. A process according to claim 16, wherein the addition of the improver is conducted prior to development of the dough.

18. A process according to claim 16, further comprising raising the dough prior to the baking step.

19. A process according to claim 18, further comprising freezing or cooling the raised dough prior to the baking step.

20. A process according to claim 16, further comprising freezing or cooling the baked dough.

* * * * *